United States Patent
Ong et al.

(10) Patent No.: US 12,531,123 B2
(45) Date of Patent: Jan. 20, 2026

(54) NON-VOLATILE MEMORY WITH AUXILIARY SELECT GATE LINE DRIVER

(71) Applicant: eMemory Technology Inc., Hsin-Chu (TW)

(72) Inventors: Wei-Chiang Ong, Hsinchu County (TW); Hsueh-Wei Chen, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 99 days.

(21) Appl. No.: 18/765,358

(22) Filed: Jul. 8, 2024

(65) Prior Publication Data

US 2025/0022511 A1 Jan. 16, 2025

Related U.S. Application Data

(60) Provisional application No. 63/532,701, filed on Aug. 15, 2023, provisional application No. 63/526,481, filed on Jul. 13, 2023.

(51) Int. Cl.
*H01L 27/11524* (2017.01)
*G11C 16/08* (2006.01)
*G11C 16/14* (2006.01)
*G11C 16/26* (2006.01)
*H10D 30/68* (2025.01)

(52) U.S. Cl.
CPC .............. *G11C 16/08* (2013.01); *G11C 16/14* (2013.01); *G11C 16/26* (2013.01); *H10D 30/68* (2025.01)

(58) Field of Classification Search
CPC .................................. H01L 27/11524
See application file for complete search history.

(56) References Cited

U.S. PATENT DOCUMENTS

| | | | |
|---|---|---|---|
| 8,941,167 B2 | 1/2015 | Chen et al. | |
| 9,805,806 B2 | 10/2017 | Chen et al. | |
| 10,693,369 B2 | 6/2020 | Ku et al. | |
| 2015/0221663 A1* | 8/2015 | Tan | H10D 30/6892 257/300 |
| 2024/0161833 A1 | 5/2024 | Chen et al. | |

* cited by examiner

Primary Examiner — Jason Lappas
(74) Attorney, Agent, or Firm — WPAT, PC

(57) ABSTRACT

A non-volatile memory with an auxiliary select gate line driver is provided. The array structure of the non-volatile memory comprises plural 2T2C memory cells in an array arrangement. The memory cells in the array structure are connected with the corresponding auxiliary select gate lines. The auxiliary select gate line driver can output specified driving voltages to the auxiliary select gate lines. Consequently, the programming efficiency, the erasing efficiency and the reading efficiency of non-volatile memory are enhanced.

17 Claims, 10 Drawing Sheets

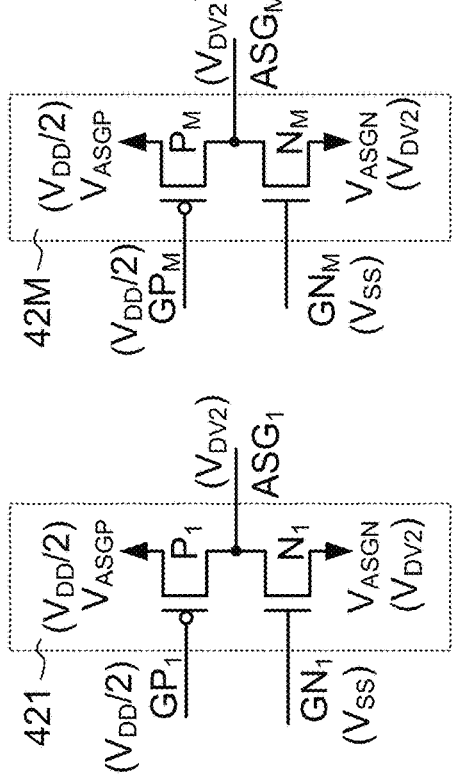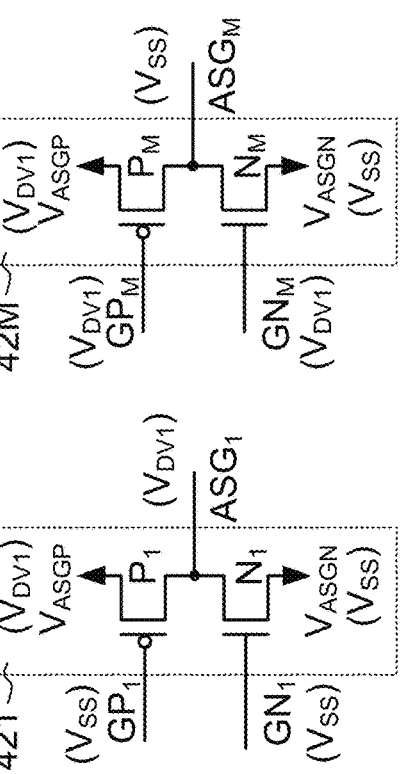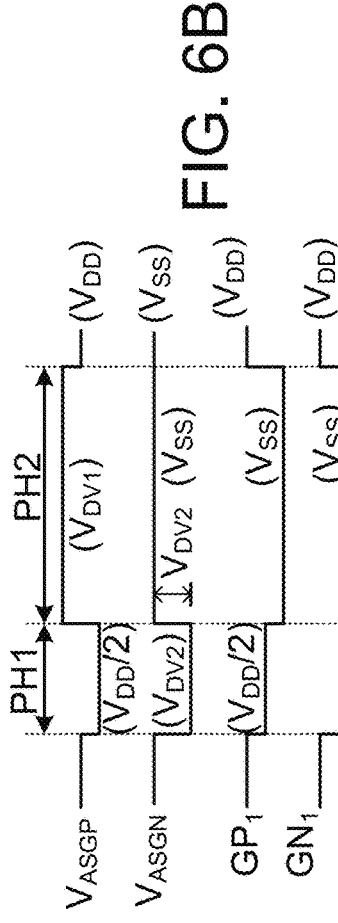

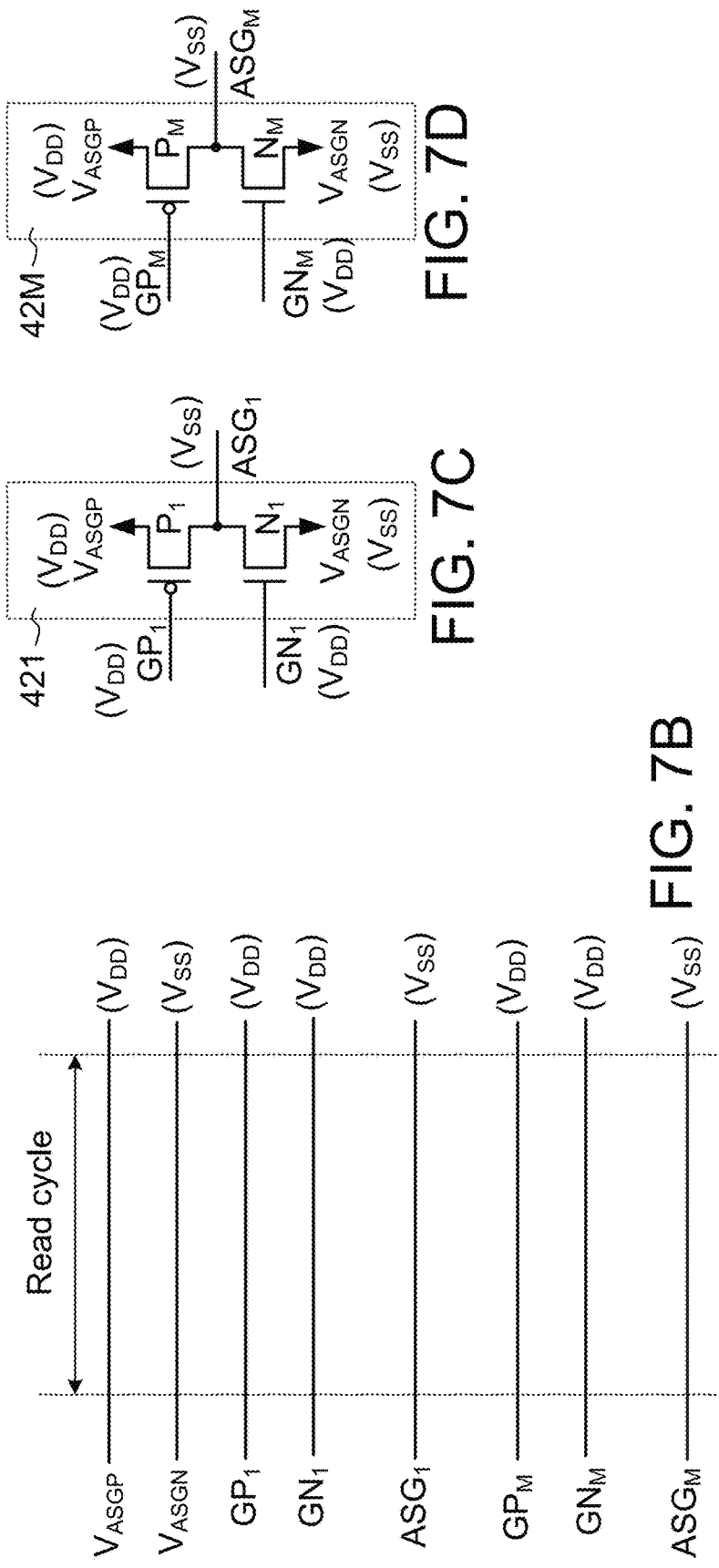

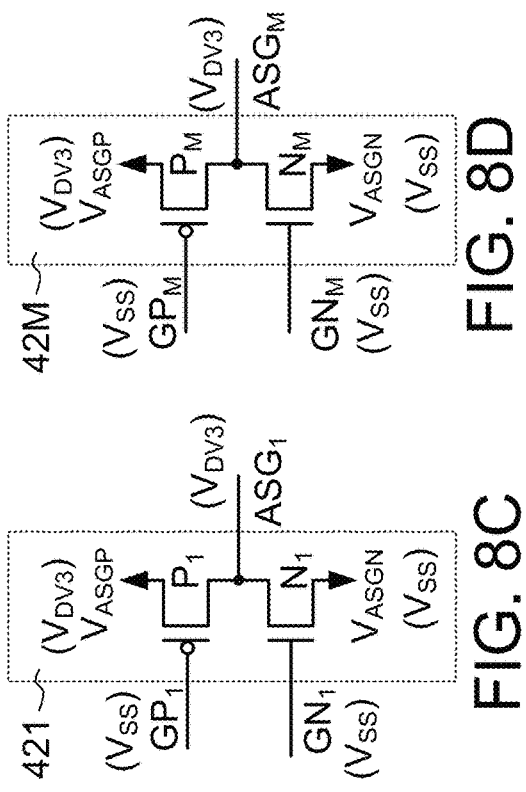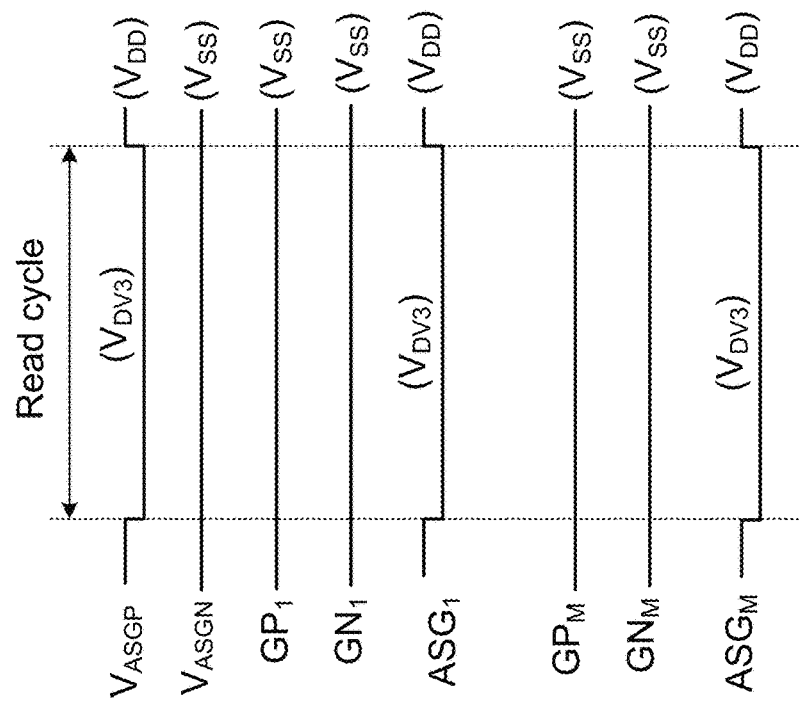

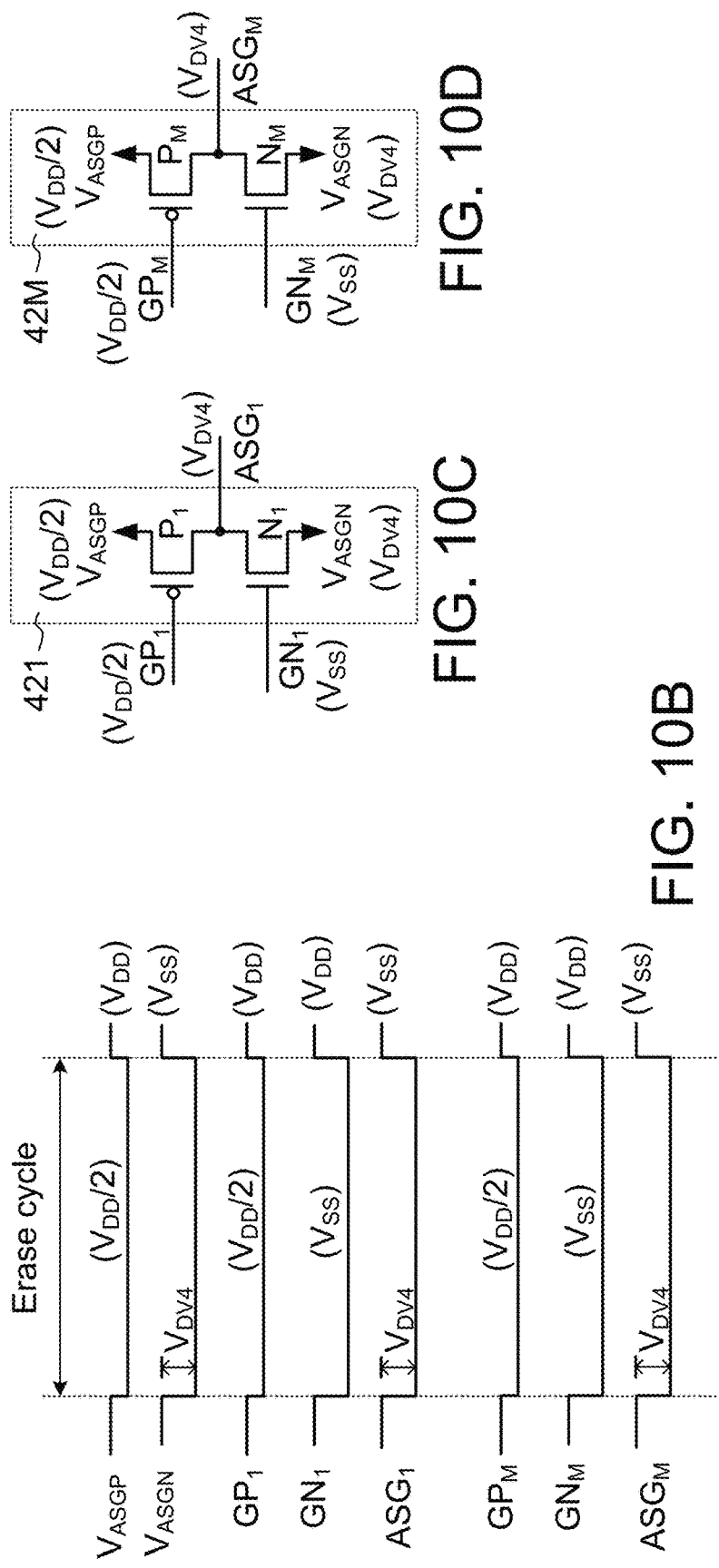

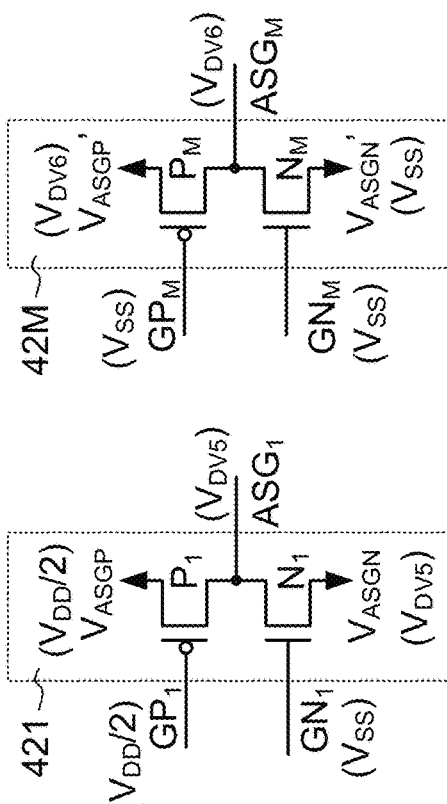
FIG. 11A
FIG. 11B
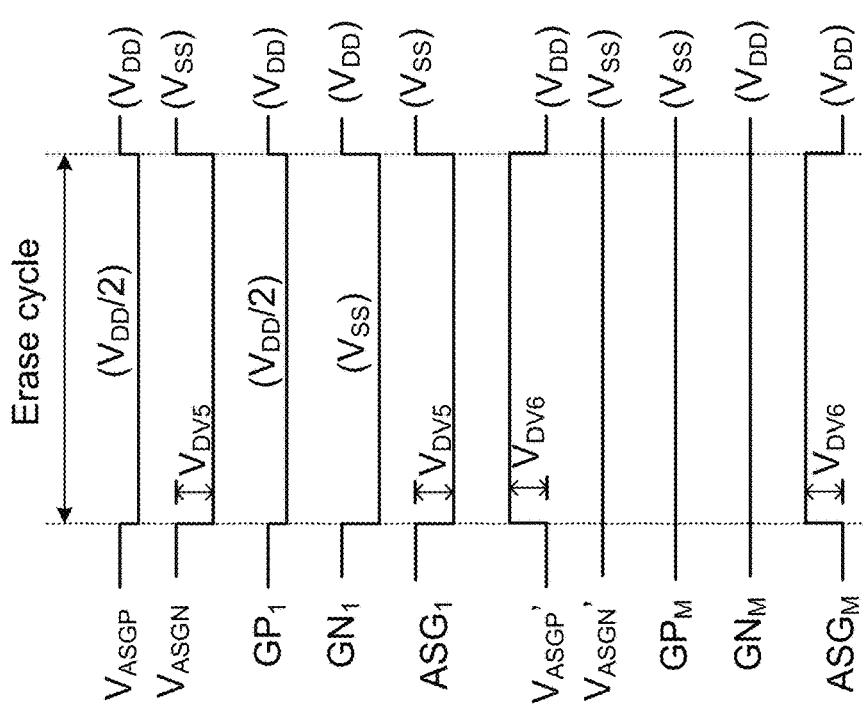
FIG. 11C
FIG. 11D

NON-VOLATILE MEMORY WITH AUXILIARY SELECT GATE LINE DRIVER

This application claims the benefit of U.S. provisional application Ser. No. 63/526,481, filed Jul. 13, 2023, and U.S. provisional application Ser. No. 63/532,701, filed Aug. 15, 2023, the subject matters of which are incorporated herein by references.

FIELD OF THE INVENTION

The present invention relates to a non-volatile memory, and more particularly to a non-volatile memory with an auxiliary select gate line driver.

BACKGROUND OF THE INVENTION

As is well known, a non-volatile memory is able to continuously retain data after being powered off. Consequently, non-volatile memories have been widely applied to various electronic products. Generally, a non-volatile memory comprises an array structure. The array structure comprises plural memory cells in an array arrangement. In addition, each memory cell comprises a floating gate transistor.

FIGS. 1A and 1B schematically illustrate associated bias voltages for performing a program action on a memory cell of a conventional non-volatile memory cell. FIGS. 1C and 1D schematically illustrate associated bias voltages for performing a read action on the memory cell of the conventional non-volatile memory cell. FIG. 1E schematically illustrates associated bias voltages for performing an erase action on the memory cell of the conventional non-volatile memory cell.

As shown in FIG. 1A, the memory cell comprises a select transistor $M_S$, a floating gate transistor $M_F$ and a capacitor $C_1$. Since this memory cell comprises two transistors and one capacitor, this memory cell is referred as a 2T1C memory cell. Furthermore, the memory cell is a multi-time programming memory cell, which is also referred to as an MTP (multiple time programmable) memory cell.

The select transistor $M_S$ and the floating gate transistor $M_F$ are p-type transistors and formed in an N-well region NW. The source terminal of the select transistor $M_S$ is connected with a source line SL. The gate terminal of the select transistor $M_S$ is connected with a word line WL. The source terminal of the floating gate transistor $M_F$ is connected with the drain terminal of the select transistor $M_S$. The drain terminal of the floating gate transistor $M_F$ is connected with a bit line BL. The capacitor $C_1$ is composed of an n-type transistor and formed in a P-well region PW. The gate terminal of the n-type transistor is formed as a first terminal of the capacitor $C_1$. The drain and source terminals of the n-type transistor are connected with each other and formed a second terminal of the capacitor $C_1$. The first terminal of the capacitor $C_1$ is connected with a floating gate 10 of the floating gate transistor $M_F$. The second terminal of the capacitor $C_1$ is connected with an erase line EL.

By providing proper bias voltages to the memory cell, a program action, a read action or an erase action can be selectively performed on the memory cell.

Please refer to FIG. 1A again. When the program action is performed on the memory cell, an on voltage $V_{ON}$ is provided to the word line WL, a program voltage $V_{PP}$ is provided to the source line SL, a ground voltage (0V) is provided to the bit line BL, and an erase line voltage $V_{EL}$ is provided to the erase line EL. In addition, the program voltage $V_{PP}$ is provided to the N-well region NW, and the ground voltage (0V) is provided to the P-well region PW. For example, the on voltage $V_{ON}$ is 0V, the program voltage $V_{PP}$ is 7V, and the erase line voltage $V_{EL}$ is in the range between 0V and 3V.

As shown in FIG. 1A, the select transistor $M_S$ is turned on, and a program current $I_{PGM}$ is generated in the region between the source line SL and the bit line BL. Consequently, a channel hot electron injection effect (also referred as a CHE injection effect) is generated in the channel region of the floating gate transistor $M_F$, and electrons are injected into the floating gate 10 of the floating gate transistor $M_F$. Under this circumstance, the memory cell is changed to a program state.

In comparison with FIG. 1A, an off voltage $V_{OFF}$ is provided to the word line WL when the program action is performed on the memory cell of FIG. 1B. Consequently, the select transistor $M_S$ is turned off, and no program current is generated in the region between the source line SL and the bit line BL. In other words, the CHE injection effect is not generated in the channel region of the floating gate transistor $M_F$, and no electrons are injected into the floating gate 10 of the floating gate transistor $M_F$. Under this circumstance, the memory cell is not programmed. That is, the memory cell is maintained in the original state (e.g., an erase state).

Please refer to FIGS. 1C and 1D. When the read action is performed on the memory cell, the on voltage $V_{ON}$ is provided to the word line WL, a read voltage $V_{READ}$ is provided to the source line SL, the ground voltage (0V) is provided to the bit line BL, and the ground voltage (0V) is provided to the erase line EL. In addition, the read voltage $V_{READ}$ is provided to the N-well region NW, and the ground voltage (0V) is provided to the P-well region PW. For example, the read voltage $V_{READ}$ is 2V.

When the read action is performed, different magnitudes of read current $I_{READ}$ will be generated depending on whether electrons are stored in the floating gate 10 of the floating gate transistor $M_F$. As shown in FIG. 1C, electrons are stored in the floating gate 10 of the floating gate transistor $M_F$. When the select transistor $M_S$ is turned on, the magnitude of the read current $I_{READ}$ generated in the region between the source line SL and the bit line BL is larger. Consequently, a sensing circuit (not shown) judges that the memory cell is in the program state. On the contrary, as shown in FIG. 1D, no electrons are stored in the floating gate 10 of the floating gate transistor $M_F$. When the select transistor $M_S$ is turned on, the magnitude of the read current $I_{READ}$ generated in the region between the source line SL and the bit line BL is very low (e.g., nearly zero). Consequently, the sensing circuit (not shown) judges that the memory cell is in the erase state.

Please refer to FIG. 1E. When the erase action is performed on the memory cell, the ground voltage (0V) is provided to the word line WL, the ground voltage (0V) is provided to the source line SL, the ground voltage (0V) is provided to the bit line BL, and an erase voltage $V_{EE}$ is provided to the erase line EL. In addition, the ground voltage (0V) is provided to the N-well region NW, and the ground voltage (0V) is provided to the P-well region PW. For example, the erase voltage $V_{EE}$ is 12V.

Please refer to FIG. 1E again. Since the erase line EL receives the erase voltage $V_{EE}$, a Fowler-Nordheim tunneling effect (also referred as a FN tunneling effect) is generated in the capacitor $C_1$. Consequently, electrons are ejected from the floating gate 10 of the floating gate transistor $M_F$ to the erase line EL through the capacitor $C_1$. Under this circumstance, the memory cell is changed to the erase state.

SUMMARY OF THE INVENTION

An embodiment of the present invention provides a non-volatile memory. The non-volatile memory includes an array structure, a word line decoder, a word line driver, an auxiliary select gate line driver, a bit line selector and a sensing circuit. The array structure is connected with a first word line, a second word line, a source line, an erase line, a first auxiliary select gate line, a second auxiliary select gate line and a bit line. The array structure includes a first memory cell and a second memory cell. The first memory cell is connected with the first word line, the first auxiliary select gate line, the erase line, the source line and the first bit line. The second memory cell is connected with the second word line, the second auxiliary select gate line, the erase line, the source line and the first bit line. The word line decoder generates a decoded signal. The word line driver receives the decoded signal and is connected with the first word line and the second word. The word line driver activates one of the first word line and the second word according to the decoded signal. The auxiliary select gate line driver receives a mode signal and the decoded signal. The auxiliary select gate line driver is connected with the first auxiliary select gate line and the second auxiliary select gate line. The bit line selector is connected with the first bit line. The sensing circuit is connected with the bit line selector. When a program action is performed, the first memory cell is determined as a selected memory cell, and the second memory cell is determined as an unselected memory cell. According to the mode signal, the first auxiliary select gate line and the second auxiliary select gate line are not driven by the auxiliary select gate line driver in a first phase of a first program mode; a first driving voltage is provided to the first auxiliary select gate line by the auxiliary select gate line driver in a second phase of the first program mode; the second auxiliary select gate line is not driven by the auxiliary select gate line driver in the second phase of the first program mode; and the first driving voltage is a positive voltage. According to the mode signal, a second driving voltage is provided to the first auxiliary select gate line and the second auxiliary select gate line by the auxiliary select gate line driver in a first phase of a second program mode; the first driving voltage is provided to the first auxiliary select gate line by the auxiliary select gate line driver in a second phase of the second program mode; the second auxiliary select gate line is not driven by the auxiliary select gate line driver in the second phase of the second program mode; and the second driving voltage is a negative voltage.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 6A is a table about the bias voltages provided to the array structure when the non-volatile memory is in a second program mode (PGM mode2);

FIG. 6B is a schematic timing waveform diagram illustrating associated signals of the auxiliary select gate line driver;

FIGS. 6C and 6D schematically illustrate bias voltages provided to the driving elements of the auxiliary select gate line driver during the first phase PH1 of the program cycle;

FIGS. 6E and 6F schematically illustrate bias voltages provided to the driving elements of the auxiliary select gate line driver during the second phase PH2 of the program cycle;

FIG. 7A is a table about the bias voltages provided to the array structure when the non-volatile memory is in a first program mode (READ mode1);

FIG. 7B is a schematic timing waveform diagram illustrating associated signals of the auxiliary select gate line driver;

FIGS. 7C and 7D schematically illustrate bias voltages provided to the driving elements of the auxiliary select gate line driver when the read action is performed;

FIG. 8A is a table about the bias voltages provided to the array structure when the non-volatile memory is in a second program mode (READ mode2);

FIG. 8B is a schematic timing waveform diagram illustrating associated signals of the auxiliary select gate line driver;

FIGS. 8C and 8D schematically illustrate bias voltages provided to the driving elements of the auxiliary select gate line driver when the read action is performed;

FIG. 10A is a table about the bias voltages provided to the array structure when the non-volatile memory is in a second erase mode (ERS mode2);

FIG. 10B is a schematic timing waveform diagram illustrating associated signals of the auxiliary select gate line driver;

FIGS. 10C and 10D schematically illustrate bias voltages provided to the driving elements of the auxiliary select gate line driver when the erase action is performed;

FIG. 11A is a table about the bias voltages provided to the array structure when the non-volatile memory is in a third erase mode (ERS mode3);

FIG. 11B is a schematic timing waveform diagram illustrating associated signals of the auxiliary select gate line driver; and FIGS. 11C and 11D schematically illustrate bias voltages provided to the driving elements of the auxiliary select gate line driver when the erase action is performed.

DETAILED DESCRIPTION OF PREFERRED EMBODIMENTS

The present invention provides a 2T2C memory cell and an array structure of a non-volatile memory. The array structure comprises plural 2T2C memory cells in an array arrangement. The memory cells in the array structure are connected with the corresponding auxiliary select gate lines. The non-volatile memory of the present invention further comprises an auxiliary select gate line driver. The auxiliary select gate line driver can output specified driving voltages to the auxiliary select gate lines. Consequently, the programming efficiency, the erasing efficiency and the reading efficiency of the non-volatile memory are enhanced.

Figure 2:
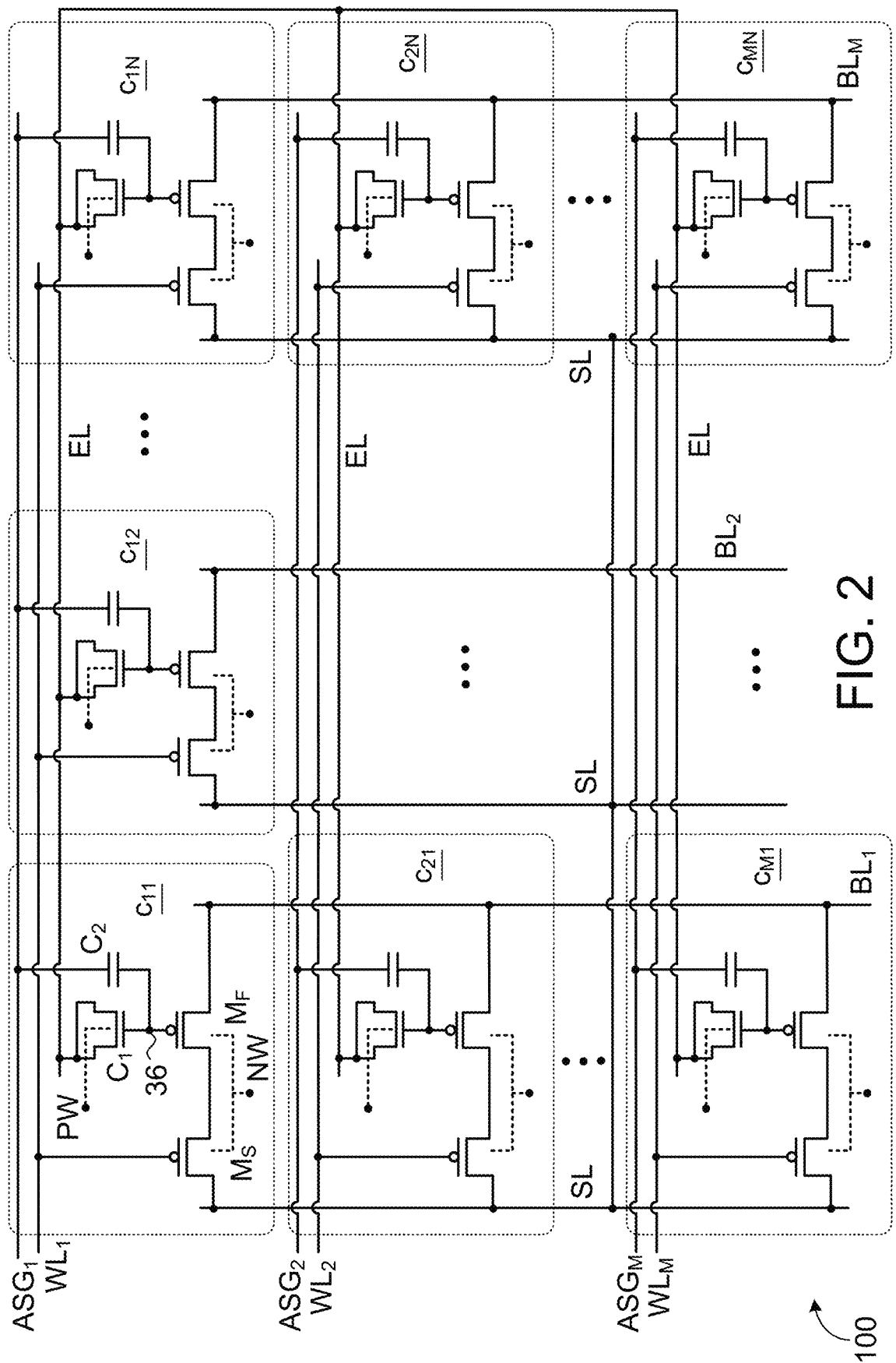
FIG. 2 is a schematic equivalent circuit diagram illustrating an array structure of a non-volatile memory according to an embodiment of the present invention.

FIG. 2 is a schematic equivalent circuit diagram illustrating an array structure of a non-volatile memory according to an embodiment of the present invention. As shown in FIG. 2, the array structure 100 of the non-volatile memory 200 comprises M×N memory cells $c_{11} \sim c_{MN}$, wherein M and N are positive integers. The structures of the memory cells $c_{11} \sim c_{MN}$ are identical. In addition, the memory cells are MTP memory cells.

Firstly, the memory cell $c_{11}$ of the array structure 100 will be described as follows. As shown in FIG. 2, the memory cell $c_{11}$ comprises a select transistor $M_S$, a floating gate transistor $M_F$, a first capacitor $C_1$ and a second capacitor $C_2$. Since this memory cell comprises two transistors and two capacitors, this memory cell is also referred as a 2T2C memory cell.

The select transistor $M_S$ and the floating gate transistor $M_F$ are p-type transistors and formed in an N-well region NW. The source terminal of the select transistor $M_S$ is connected with a source line SL. The gate terminal of the select transistor $M_S$ is connected with a word line $WL_1$. The source terminal of the floating gate transistor $M_F$ is connected with the drain terminal of the select transistor $M_S$. The drain terminal of the floating gate transistor $M_F$ is connected with a bit line $BL_1$. The first capacitor $C_1$ is composed of an n-type transistor and formed in a P-well region PW. The gate terminal of the n-type transistor is formed as a first terminal of the first capacitor $C_1$. The drain and source terminals of the n-type transistor are connected with each other and formed a second terminal of the first capacitor $C_1$. The first terminal of the first capacitor $C_1$ is connected with a floating gate 36 of the floating gate transistor $M_F$. The second terminal of the first capacitor $C_1$ is connected with an erase line EL. The second capacitor $C_2$ is a plate capacitor. The first terminal of the second capacitor $C_2$ is connected with the floating gate 36 of the floating gate transistor $M_F$. The second terminal of the second capacitor $C_2$ is connected with an auxiliary select gate line $ASG_1$. It is noted that the example of the second capacitor $C_2$ is not restricted to the plate capacitor. In a variant example, the second capacitor $C_2$ is similar to the first capacitor $C_1$, i.e., a transistor. Alternatively, the second capacitor $C_2$ comprises plural parallel-connected capacitors of various types.

Figure 1A:
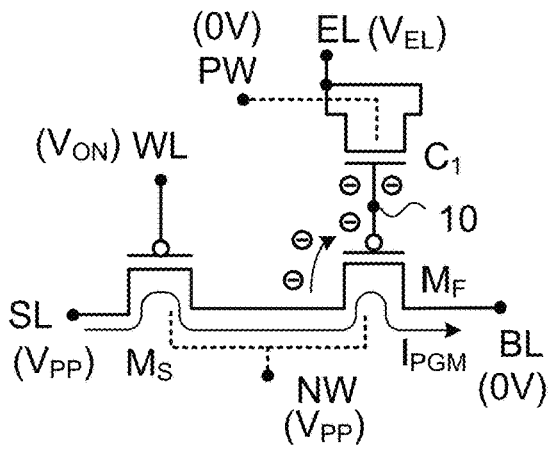
FIGS. 1A and 1B (prior art) schematically illustrate associated bias voltages for performing a program action on a memory cell of a conventional non-volatile memory cell.
Figure 1B:
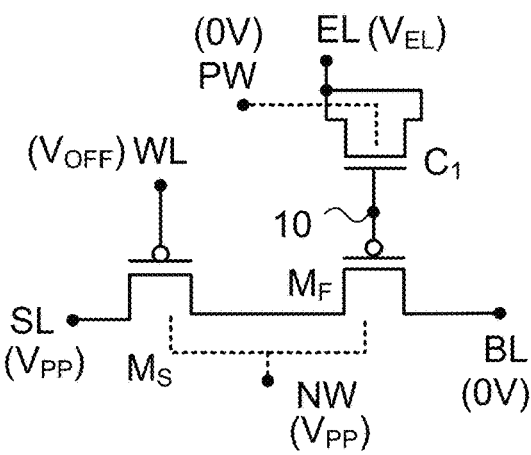
Figure 1C:
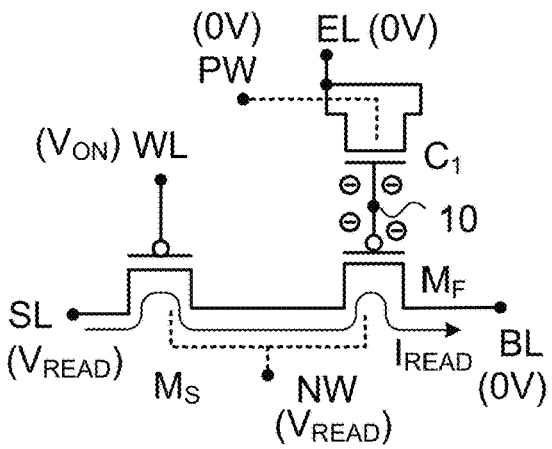
FIGS. 1C and 1D (prior art) schematically illustrate associated bias voltages for performing a read action on the memory cell of the conventional non-volatile memory cell.
Figure 1D:
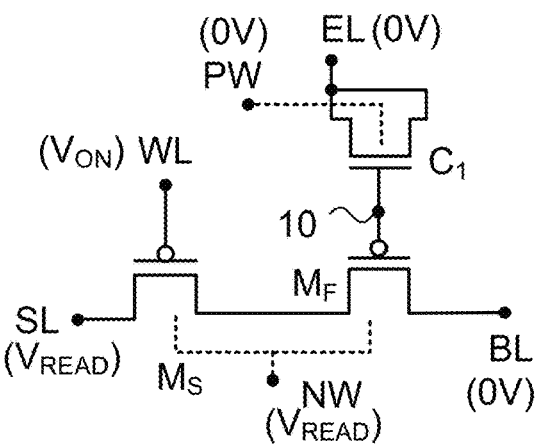
Figure 1E:
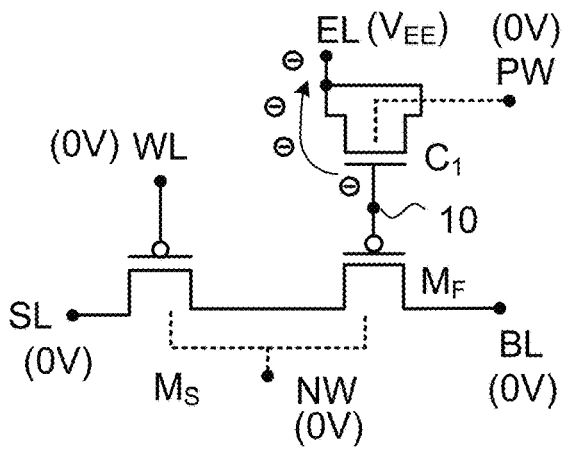
FIG. 1E (prior art) schematically illustrates associated bias voltages for performing an erase action on the memory cell of the conventional non-volatile memory cell.

When the program actions are performed on the memory cells $c_{11} \sim c_{MN}$ in the array structure 100, the electrons injecting paths are similar to those shown in FIGS. 1A and 1B. When the erase actions are performed on the memory cells $c_{11} \sim c_{MN}$ in the array structure 100, the electrons ejecting paths are similar to those shown in FIG. 1E. When the read actions are performed on the memory cells $c_{11} \sim c_{MN}$ in the array structure 100, the judging methods are similar to those shown in FIGS. 1C and 1D.

In accordance with a technical feature of the present invention, the memory cells $c_{11} \sim c_{MN}$ in the array structure 100 are also connected with the corresponding auxiliary select gate lines $ASG_1 \sim ASG_M$. When the program action, the erase action or the read operation is performed, specified driving voltages are provided to the corresponding auxiliary select gate lines $ASG_1 \sim ASG_M$. Consequently, the programming efficiency, the erasing efficiency and the reading efficiency of the non-volatile memory are enhanced.

Please refer to FIG. 2. The N memory cells $c_{11} \sim c_{1N}$ in the first row of the array structure 100 are connected with the same word line $WL_1$ and the same auxiliary select gate line $ASG_1$. The N memory cells $c_{11} \sim c_{1N}$ in the first row of the array structure 100 are respectively connected with N bit lines $BL_1 \sim BL_N$. The N memory cells $c_{21} \sim c_{2N}$ in the second row of the array structure 100 are connected with the same word line $WL_2$ and the same auxiliary select gate line $ASG_2$. The N memory cells $c_{21} \sim c_{2N}$ in the second row of the array structure 100 are respectively connected with the N bit lines $BL_1 \sim BL_N$. The rest may be deduced by analogy. The N memory cells $c_{M1} \sim c_{MN}$ in the M-th row of the array structure 100 are connected with the same word line $WL_M$ and the same auxiliary select gate line $ASG_M$. The N memory cells $c_{M1} \sim c_{MN}$ in the M-th row of the array structure 100 are respectively connected with the N bit lines $BL_1 \sim BL_N$. In addition, all memory cells $c_{11} \sim c_{MN}$ are connected with the same source line SL, and all memory cells $c_{11} \sim c_{MN}$ are connected with the same erase line EL.

Figure 3:
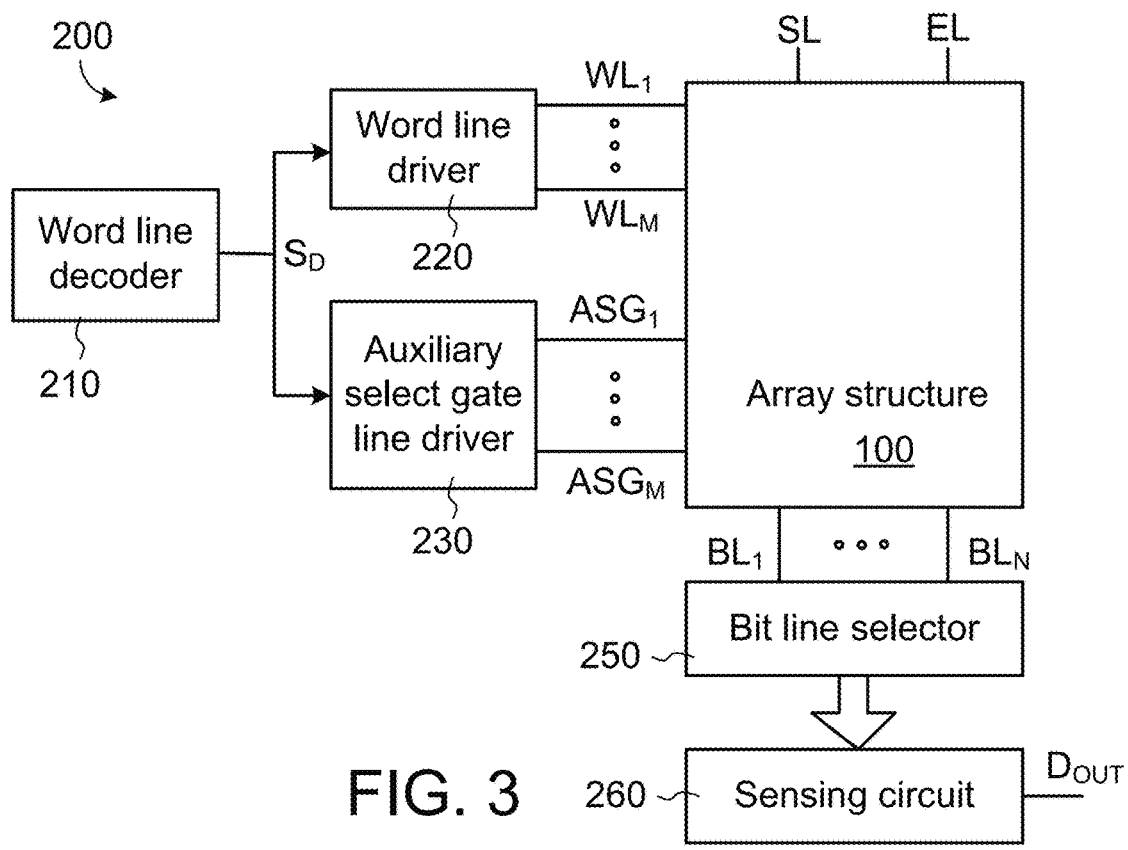
FIG. 3 is a schematic circuit block diagram illustrating the non-volatile memory according to the embodiment of the present invention.

FIG. 3 is a schematic circuit block diagram illustrating the non-volatile memory according to the embodiment of the present invention. As shown in FIG. 3, the non-volatile memory 200 comprises a word line decoder 210, a word line driver 220, an auxiliary select gate line driver 230, the array structure 100, a bit line selector 250 and a sensing circuit 260. The array structure 100 is identical to the array structure 100 shown in FIG. 2, and not redundantly described herein.

The word line decoder 210 is connected with the word line driver 220 and the auxiliary select gate line driver 230. The word line driver 220 is connected with the word lines $WL_1 \sim WL_M$. The auxiliary select gate line driver 230 is connected with the auxiliary select gate lines $ASG_1 \sim ASG_M$. The bit line selector 250 is connected with the bit lines $BL_1 \sim BL_N$. The sensing circuit 260 is connected with the bit line selector 250. The sensing circuit 260 generates an output data $D_{OUT}$.

In the array structure 100, the memory cells $c_{11} \sim c_{MN}$ are MTP memory cells. Consequently, the program action, the erase action or the read action can be performed on the memory cells $c_{11}$~$c_{MN}$ of the non-volatile memory 200.

The word line decoder 210 issues a decoded signal $S_D$ to the word line driver 220. According to the decoded signal $S_D$, the word line driver 220 activates one of the M word lines $WL_1$~$WL_M$. Consequently, one of the M rows in the array structure 100 is the selected row. In addition, the bit line selector 250 activates one of the bit lines. Consequently, a selected memory cell in the selected row is determined.

For example, the word line driver 220 activates the word line $WL_1$. In other words, the first row in the array structure 100 is the selected row. When only the bit line $BL_1$ is activated by the bit line selector 250, only the memory cell $c_{11}$ is the selected memory cell. When the bit lines $BL_1$~$BL_8$ are activated by the bit line selector 250, the memory cells $c_{11}$~$c_{18}$ are the selected memory cells.

When the program action is performed, the word line driver 220 provides an on voltage $V_{ON}$ to one of the M word lines $WL_1$~$WL_M$. Consequently, one of the M word lines $WL_1$~$WL_M$ is activated. In addition, the auxiliary select gate line driver 230 provides various driving voltages to the M auxiliary select gate lines $ASG_1$~$ASG_M$. According to the activated word line, one row in the array structure 100 is determined as the selected row. In addition, at least one bit line is activated by the bit line selector 250. According to the activated word line and the activated bit line, at least one selected memory cell in the selected row is determined. After the program action is performed on the at least one selected memory cell, the at least one selected memory cell is programmed to the program state.

When the read action is performed, one of the M word lines $WL_1$~$WL_M$ is activated. According to the activated word line, one row in the array structure 100 is determined as the selected row. In addition, the auxiliary select gate line driver 230 provides various driving voltages to the M auxiliary select gate lines $ASG_1$~$ASG_M$. In addition, at least one bit line is activated by the bit line selector 250. According to the activated word line and the activated bit line, at least one selected memory cell in the selected row is determined. The selected memory cell generates a cell current. The cell current is transmitted to the sensing circuit 260 through the bit line selector 250. Consequently, the sensing circuit 260 performs the read action to judge the storage state of the selected memory cell and generate the output data $D_{OUT}$.

As mentioned above, the memory cells $c_{M1}$~$c_{MN}$ in the array structure 100 are connected with the erase line EL. When the erase action is performed, the auxiliary select gate line driver 230 provides the same driving voltage to the M auxiliary select gate lines $ASG_1$~$ASG_M$. Consequently, all memory cells $c_{M1}$~$c_{MN}$ in the array structure 100 are erased simultaneously, and all memory cells $c_{M1}$~$c_{MN}$ are changed to the erase state.

In an embodiment, the driving voltages provided from the auxiliary select gate line driver 230 to the M auxiliary select gate lines $ASG_1$~$ASG_M$ are different. Consequently, a portion of the memory cells determined by the auxiliary select gate line driver 230 are erased, and another portion of the memory cells in the array structure 100 are not erased.

As mentioned above, the memory cells $c_{M1}$~$c_{MN}$ in the array structure 100 are MTP memory cells. That is, each of the memory cells $c_{M1}$~$c_{MN}$ can be subjected to the program action and the erase action many times. After the non-volatile memory 200 is just manufactured, the memory cells $c_{11}$~$c_{MN}$ have better characteristics and are less prone to program fail or ease fail. On the contrary, after the memory cells $c_{11}$~$c_{MN}$ has been subjected the program action and the erasing action many times, the characteristics of the memory cells $c_{11}$~$c_{MN}$ deteriorate, and the program failure or erase failure may occur. For example, if the erase count of the memory cells $c_{11}$~$c_{MN}$ does not exceed a specified count (e.g., 1000), it is considered that the memory cells have better characteristics. Whereas, if the erase count of the memory cells $c_{11}$~$c_{MN}$ exceeds the specified count, it is considered that the memory cells have inferior characteristics. In the above embodiment, the characteristics of the memory cells are determined according to the erase count. Of course, in the variant examples, the characteristics of the memory cells may be determined according to the program failure count or the erase failure count.

For example, if a memory cell has better characteristics and is in the erase state, the threshold voltage Vt of the floating gate transistor is −1V. However, if the characteristics of the memory cell become inferior, the memory cell may be over-erased after the erase action is performed. If the memory cell has inferior characteristics and is over-erased, the threshold voltage Vt of the floating gate transistor is possibly shifted to −1.2V. After the over-erased memory cell is subjected to the program action again, it is difficult to turn on the floating gate transistor $M_F$. Since the program current is too low, the program fail problem occurs. Under this circumstance, it is necessary to perform the program action many times to eliminate the program fail problem.

In order to cope with the memory cells with different characteristics, the auxiliary select gate line driver 230 can be operated in different modes when the program action, the erase action or the read action is performed. Furthermore, when the program action is performed, the auxiliary select gate line driver 230 provides different driving voltages in different phases of the program cycle. Consequently, the program efficiency is enhanced. Similarly, when the erase action is performed, the auxiliary select gate line driver 230 provides different driving voltages in different mode. Consequently, the erase efficiency is enhanced. Similarly, when the read action is performed, the auxiliary select gate line driver 230 provides different driving voltages in different mode. Consequently, the read efficiency is enhanced.

Figure 4:
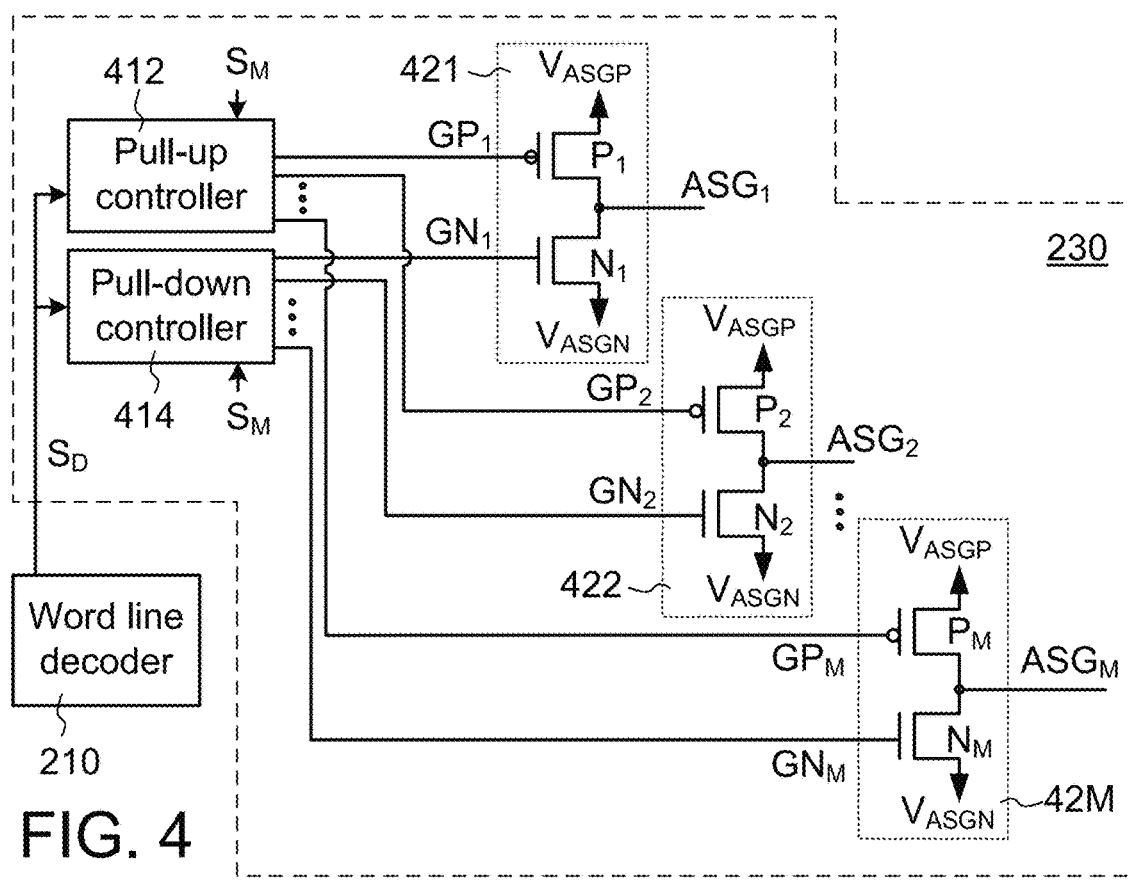
FIG. 4 is a schematic circuit diagram illustrating the auxiliary select gate line driver of the non-volatile memory according to the embodiment of the present invention.

FIG. 4 is a schematic circuit diagram illustrating the auxiliary select gate line driver of the non-volatile memory according to the embodiment of the present invention. As shown in FIG. 4, the auxiliary select gate line driver 230 comprises a pull-up controller 412, a pull-down controller 414 and M driving elements 421~42M. The circuitry structures of these driving elements 421~42M are identical. For example, the driving element 421 comprises a P-type transistor $P_1$ and an N-type transistor $N_1$. The source terminal of the P-type transistor $P_1$ receives a first supply voltage $V_{ASGP}$. The gate terminal of the P-type transistor $P_1$ receives a control signal $GP_1$. The drain terminal of the P-type transistor $P_1$ is connected with the drain terminal of N-type transistor $N_1$. The gate terminal of the N-type transistor $N_1$ receive a control signal $GN_1$. The source terminal of the N-type transistor $N_1$ receives a second supply voltage $V_{ASGN}$. The drain terminal of the P-type transistor $P_1$ is connected with the auxiliary select gate line $ASG_1$. In addition, the driving element 421 can output a driving voltage to the auxiliary select gate line $ASG_1$.

As shown in FIG. 4, the pull-up controller 412 and the pull-down controller 414 are connected with the word line decoder 210 to receive the decoded signal $S_D$. Also, the pull-up controller 412 and the pull-down controller 414 receive a mode signal $S_M$. In addition, the pull-up controller 412 and the pull-down controller 414 are connected with the M driving elements 421~42M. The M driving elements 421~42M are respectively connected with the auxiliary select gate lines $ASG_1$~$ASG_M$. According to the decoded signal $S_D$ and a mode signal $S_M$, the pull-up controller 412 generates the control signals $GP_1$~$GP_M$, and the pull-down controller 414 generates the control signal $GN_1$~$GN_M$. The M driving elements 421~42M receive the corresponding control signals $GP_1$~$GP_M$ and the corresponding control signal $GN_1$~$GN_M$. Consequently, the M driving elements 421~42M output various driving voltages to the auxiliary select gate lines $ASG_1$~$ASG_M$. Each of the driving elements 421~42M comprises two transistors. In a normal working state, one of the two transistors is turned on, and the other transistor is turned off.

According to the mode signal $S_M$, the M driving elements 421~42M output various driving voltages to the auxiliary select gate lines $ASG_1$~$ASG_M$ under control of the pull-up controller 412 and the pull-down controller 414. That is, in different modes, the voltage levels of the first supply voltage $V_{ASGP}$ and the second supply voltage $V_{ASGN}$ are changed, and the voltage levels of the control signals $GP_1$~$GP_M$ and the control signal $GN_1$~$GN_M$ are changed. For example, the pull-up controller 412 can provide the first supply voltage $V_{ASGP}$ with different voltage levels and provide the control signals $GP_1$~$GP_M$ with different voltage levels in different modes to control the on/off states of the P-type transistors $P_1$~$P_M$ in the driving elements 421~42M. Similarly, the pull-down controller 414 can provide the second supply voltage $V_{ASGN}$ with different voltage levels and provide the control signals $GN_1$~$GN_M$ with different voltage levels in different modes to control the on/off states of the N-type transistors $N_1$~$N_M$ in the driving elements 421~42M.

The operations of the auxiliary select gate line driver 230 in different modes will be described as follows. In the following examples, the first memory cell $c_{11}$ in the first row of the array structure 100 is the selected memory cell, and the other memory cells are the unselected memory cells. That is, the first row is the selected row, and the other rows are the unselected rows. According to the decoded signal $S_D$, the auxiliary select gate line driver 230 provides the corresponding driving voltages to the auxiliary select gate line $ASG_1$ (i.e., the selected row) and the auxiliary select gate lines $ASG_2$~$ASG_M$ (i.e., the unselected rows). The driving voltages provided to the auxiliary select gate lines $ASG_2$~$ASG_M$ (i.e., the unselected rows) are identical. For brevity, only the driving element 42M corresponding to the unselected row will be described as follows. In the following examples, the driving voltages provided from the auxiliary select gate line driver 230 to the auxiliary select gate lines $ASG_1$~$ASG_M$ will be described. The bias voltages provided to the word lines $WL_1$~$WL_N$, the source line SL and the erase line EL are similar to those of FIGS. 1A to 1E, and not redundantly described herein.

According to the mode signal $S_M$, the non-volatile memory 200 can be operated in a first program mode (PGM mode1), a second program mode (PGM mode2), a first read mode (READ mode1), a second read mode (READ mode2), a first erase mode (ERS mode1), a second erase mode (ERS mode2) or a third program mode (ERS mode3).

Figure 5D:
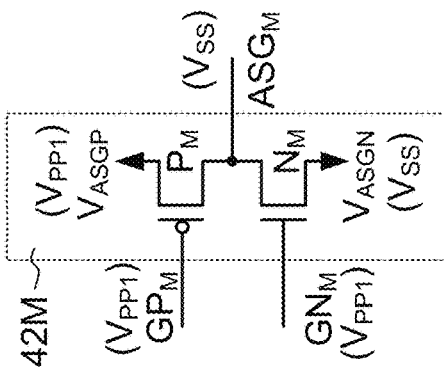
FIGS. 5C and 5D schematically illustrate bias voltages provided to the driving elements of the auxiliary select gate line driver during the first phase PH1 of the program cycle.
Figure 5F:
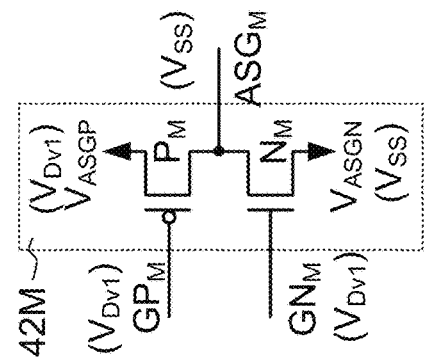
FIGS. 5E and 5F schematically illustrate bias voltages provided to the driving elements of the auxiliary select gate line driver during the second phase PH2 of the program cycle.
Figure 5C:
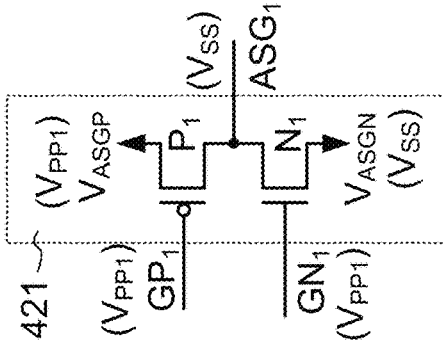
Figure 5E:
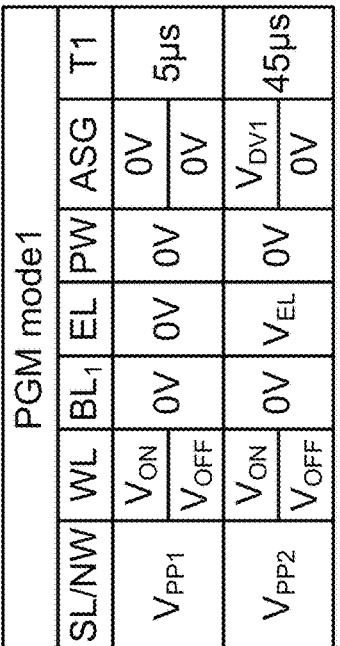
Figure 5A:
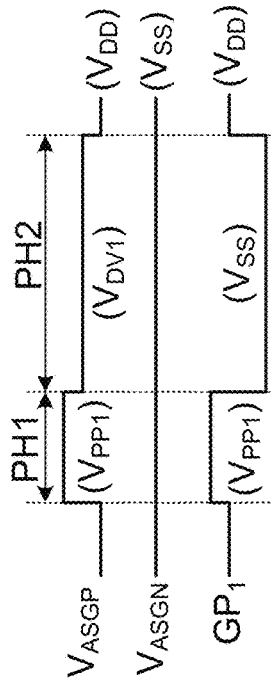
FIG. 5A is a table about the bias voltages provided to the array structure when the non-volatile memory is in a first program mode (PGM mode1)
Figure 5B:
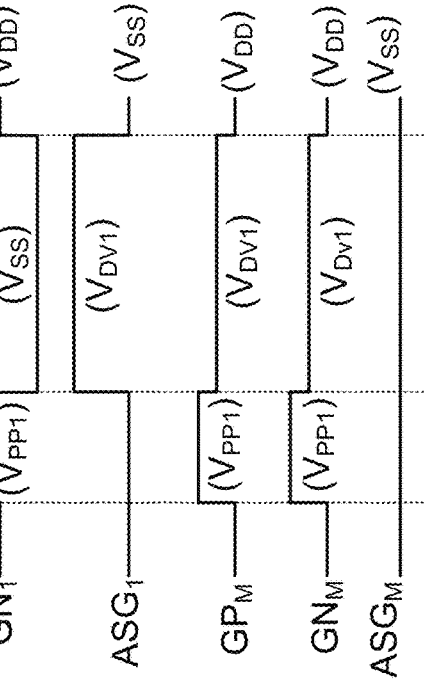
FIG. 5B is a schematic timing waveform diagram illustrating associated signals of the auxiliary select gate line driver.

FIG. 5A is a table about the bias voltages provided to the array structure when the non-volatile memory is in a first program mode (PGM mode1). FIG. 5B is a schematic timing waveform diagram illustrating associated signals of the auxiliary select gate line driver. FIGS. 5C and 5D schematically illustrate bias voltages provided to the driving elements of the auxiliary select gate line driver during the first phase PH1 of the program cycle. FIGS. 5E and 5F schematically illustrate bias voltages provided to the driving elements of the auxiliary select gate line driver during the second phase PH2 of the program cycle.

The non-volatile memory 200 receives a first system operation voltage $V_{DD}$ and a second system operation voltage $V_{SS}$. For example, the first system operation voltage $V_{DD}$ is 3.3V, and the second system operation voltage $V_{SS}$ is the ground voltage (0V). A first program voltage $V_{PP1}$ is higher than a second program voltage $V_{PP2}$. For example, the first program voltage $V_{PP1}$ is 10V, and the second program voltage $V_{PP2}$ is 7V. A first driving voltage $V_{DV1}$ is a positive voltage, and the first driving voltage $V_{DV1}$ is higher than or equal to the second program voltage $V_{PP2}$. For example, the first driving voltage $V_{DV1}$ is 9V.

In addition, the program cycle of the program cycle contains a first phase PH1 and a second phase PH2. The time period of the first phase PH1 is about 5 µs, and the time period of the second phase PH2 is about 45 µs. As long as the time period of the second phase PH2 is larger than the time period of the first phase PH1, the time period of the first phase PH1 and the time period of the second phase PH2 are not restricted.

In the first phase PH1, the first supply voltage $V_{ASGP}$ is $V_{PP1}$, and the second supply voltage $V_{ASGN}$ is $V_{SS}$. Each of the control signal $GP_1$, the control signal $GN_1$, the control signal $GP_M$ and the control signal $GN_M$ is the first program voltage $V_{PP1}$. In the driving element 421, the P-type transistor $P_1$ is turned off, and the N-type transistor $N_1$ is turned on. The voltage level of the driving voltage provided from the driving element 421 to the auxiliary select gate line $ASG_1$ of the selected row is $V_{SS}$ (0V). In the driving element 42M, the P-type transistor $P_M$ is turned off, and the N-type transistor $N_M$ is turned on. The voltage level of the driving voltage provided from the driving element 42M to the auxiliary select gate line $ASG_M$ of the unselected row is $V_{SS}$ (0V).

In the second phase PH2, the first supply voltage $V_{ASGP}$ is $V_{DV1}$, and the second supply voltage $V_{ASGN}$ is $V_{SS}$. The control signal $GP_1$ is $V_{SS}$. The control signal $GN_1$ is $V_{SS}$. The control signal $GP_M$ is $V_{DV1}$. The control signal $GN_M$ is $V_{DV1}$. In the driving element 421, the P-type transistor $P_1$ is turned on, and the N-type transistor $N_1$ is turned off. The voltage level of the driving voltage provided from the driving element 421 to the auxiliary select gate line $ASG_1$ of the selected row is $V_{DV1}$. In the driving element 42M, the P-type transistor $P_M$ is turned off, and the N-type transistor $N_M$ is turned on. The voltage level of the driving voltage provided from the driving element 42M to the auxiliary select gate line $ASG_M$ of the unselected row is $V_{SS}$ (0V).

FIG. 6A is a table about the bias voltages provided to the array structure when the non-volatile memory is in a second program mode (PGM mode2). FIG. 6B is a schematic timing waveform diagram illustrating associated signals of the auxiliary select gate line driver. FIGS. 6C and 6D schematically illustrate bias voltages provided to the driving elements of the auxiliary select gate line driver during the first phase PH1 of the program cycle. FIGS. 6E and 6F schematically illustrate bias voltages provided to the driving elements of the auxiliary select gate line driver during the second phase PH2 of the program cycle. A second driving voltage $V_{DV2}$ is a negative voltage. For example, the second driving voltage $V_{DV2}$ is −2V.

In the first phase PH1, the first supply voltage $V_{ASGP}$ is $V_{DD}/2$, and the second supply voltage $V_{ASGN}$ is the second driving voltage $V_{DV2}$. The control signal $GP_1$ is $V_{DD}/2$. The control signal $GN_1$ is $V_{SS}$. The control signal $GP_M$ is $V_{DD}/2$. The control signal $GN_M$ is $V_{SS}$. In the driving element 421, the P-type transistor $P_1$ is turned off, and the N-type transistor $N_1$ is turned on. The voltage level of the driving voltage provided from the driving element 421 to the auxiliary select gate line $ASG_1$ of the selected row is $V_{DV2}$ (−2V). In the driving element 42M, the P-type transistor $P_M$ is turned off, and the N-type transistor $N_M$ is turned on. The voltage level of the driving voltage provided from the driving element 42M to the auxiliary select gate line $ASG_M$ of the unselected row is $V_{DV2}$ (−2V).

In the second phase PH2, the first supply voltage $V_{ASGP}$ is the first driving voltage $V_{DV1}$, and the second supply voltage $V_{ASGN}$ is $V_{SS}$. The control signal $GP_1$ is $V_{SS}$. The control signal $GN_1$ is $V_{SS}$. The control signal $GP_M$ is $V_{DV1}$. The control signal $GN_M$ is $V_{DV1}$. In the driving element 421, the P-type transistor $P_1$ is turned on, and the N-type transistor $N_1$ is turned off. The voltage level of the driving voltage provided from the driving element 421 to the auxiliary select gate line $ASG_1$ of the selected row is $V_{DV1}$. In the driving element 42M, the P-type transistor $P_M$ is turned off, and the N-type transistor $N_M$ is turned on. The voltage level of the driving voltage provided from the driving element 42M to the auxiliary select gate line $ASG_M$ of the unselected row is $V_{SS}$ (0V).

In the first phase PH1 of the second program mode (PGM mode2), the first supply voltage $V_{ASGP}$ is not restricted to $V_{DD}/2$. For example, the first supply voltage $V_{ASGP}$ is a control voltage. The control voltage is lower than $V_{DD}$ and higher than or equal to 0V. Alternatively, in the first phase PH1, the first supply voltage $V_{ASGP}$ is decreased to a negative voltage. For allowing the transistors $P_1$, $P_M$, $N_1$ and $N_M$ in the driving elements 421 and 42M to be operated in a safe operating area (SOA), the first supply voltage and the second supply voltage need to be properly adjusted. For example, at the beginning of the first phase PH1, the first supply voltage $V_{ASGP}$ is firstly decreased to $V_{DD}/2$, and then the second supply voltage $V_{ASGN}$ is decreased to the second driving voltage $V_{DV2}$. At the end of the first phase PH1, the second supply voltage $V_{ASGN}$ is firstly increased to $V_{SS}$, and then first supply voltage $V_{ASGP}$ is increased to $V_{DV1}$.

In accordance with the present invention, the first program mode (i.e., PGM mode1) can be applied to the memory cells with better characteristics, and the second program mode (i.e., PGM mode2) can be applied to the memory cells with inferior characteristics.

When the program action of FIG. 5A and the program action of FIG. 6A are performed, the voltage levels of the corresponding auxiliary select gate lines in the first phase PH1 are distinguished. Please refer to FIG. 6A. In the first phase PH1 of the second program mode (PGM mode2), the second driving voltage $V_{DV2}$ with the negative voltage is provided to the auxiliary select gate line $ASG_1$. Therefore, the floating gate transistor in the selected memory cell can be turned on more easily, and more electrons are injected into the floating gate, which allows the selected memory cell with inferior characteristics to quickly transit from the over-erased state to the program state. In the situation of FIG. 5A, the memory cell has the better characteristics, and $V_{SS}$ (0V) is provided from the driving element 421 to the auxiliary select gate line $ASG_1$ in the first phase PH1. That is to say, in the first phase PH1, electrons can be efficiently injected into the floating gate of the floating gate transistor even if no negative voltage is applied to the auxiliary select gate line $ASG_1$.

When the program action of FIG. 5A and the program action of FIG. 6A are performed, the auxiliary select gate line $ASG_1$ of the selected memory cell receives the first driving voltage $V_{DV1}$ in the second phase PH2. Consequently, the program efficiency of the selected memory cell is enhanced. In addition, the auxiliary unselect gate line $ASG_M$ is not driven and the select transistor of the unselected memory cell is turned off. Consequently, electrons will not be injected into the floating gate of the unselected memory cell.

In the two program modes of the above embodiment, the program action performed on a single selected memory cell is illustrated. It is noted that the two program modes can be applied to the process of programming plural memory cells in the array structure 100. For example, a byte program action is performed on eight memory cells.

In an implementation example, a byte program action is performed on the memory cells in the first row of the array structure 100. When the byte program action is performed, the word line $WL_1$ is activated, and thus the first row is the selected row. Then, the eight bit lines $BL_1$~$BL_8$ are activated sequentially. Consequently, in the first phase PH1 of the second program mode, the eight selected memory cells $c_{11}$~$c_{18}$ are activated sequentially. After the above procedure is completed, the eight bit lines $BL_1$~$BL_8$ are activated simultaneously. Then, in the second phase PH2 of the second program mode, the eight selected memory cells $c_{11}$~$c_{18}$ are activated simultaneously. Consequently, the total program time of the byte program action is 85 μs (i.e., 5×8+45=85).

FIG. 7A is a table about the bias voltages provided to the array structure when the non-volatile memory is in a first read mode (READ mode1). FIG. 7B is a schematic timing waveform diagram illustrating associated signals of the auxiliary select gate line driver. FIGS. 7C and 7D schematically illustrate bias voltages provided to the driving elements of the auxiliary select gate line driver when the read action is performed. For example, the read voltage $V_{READ}$ is 2V.

During the read cycle, the first supply voltage $V_{ASGP}$ is $V_{DD}$, and the second supply voltage $V_{ASGN}$ is $V_{SS}$. Each of the control signal $GP_1$, the control signal $GN_1$, the control signal $GP_M$ and the control signal $GN_M$ is $V_{DD}$. In the driving element 421, the P-type transistor $P_1$ is turned off, and the N-type transistor $N_1$ is turned on. The voltage level of the driving voltage provided from the driving element 421 to the auxiliary select gate line $ASG_1$ of the selected row is $V_{SS}$ (0V). In the driving element 42M, the P-type transistor $P_M$ is turned off, and the N-type transistor $N_M$ is turned on. The voltage level of the driving voltage provided from the driving element 42M to the auxiliary select gate line $ASG_M$ of the unselected row is $V_{SS}$ (0V). That is, in the first read mode (READ mode1), all driving voltages provided to auxiliary select gate lines $ASG_1$~$ASG_M$ are $V_{SS}$ (0V). That means all the auxiliary select gate lines $ASG_1$~$ASG_M$ are not driven.

FIG. 8A is a table about the bias voltages provided to the array structure when the non-volatile memory is in a second read mode (READ mode2). FIG. 8B is a schematic timing waveform diagram illustrating associated signals of the auxiliary select gate line driver. FIGS. 8C and 8D schematically illustrate bias voltages provided to the driving elements of the auxiliary select gate line driver when the read action is performed. A third driving voltage $V_{DV3}$ is lower than the first system operation voltage $V_{DD}$. In addition, the third driving voltage $V_{DV3}$ is higher than the second system operation voltage $V_{SS}$. For example, the third driving voltage $V_{DV3}$ is 1V.

During the read cycle, the first supply voltage $V_{ASGP}$ is $V_{DV3}$, and the second supply voltage $V_{ASGN}$ is $V_{SS}$. Each of the control signal $GP_1$, the control signal $GN_1$, the control signal $GP_M$ and the control signal $GN_M$ is $V_{SS}$. In the driving element 421, the P-type transistor $P_1$ is turned on, and the N-type transistor $N_1$ is turned off. The voltage level of the driving voltage provided from the driving element 421 to the auxiliary select gate line $ASG_1$ of the selected row is $V_{DV3}$ (1V). In the driving element 42M, the P-type transistor $P_M$ is turned on, and the N-type transistor NM is turned off. The voltage level of the driving voltage provided from the driving element 42M to the auxiliary select gate line $ASG_M$ of the unselected row is $V_{DV3}$ (1V). That is, in the second read mode (READ mode2), all driving voltages provided to auxiliary select gate lines $ASG_1$~$ASG_M$ are $V_{DV3}$ (1V).

In accordance with the present invention, the first read mode (READ mode1) can be applied to the memory cells with better characteristics, and the second read mode (READ mode2) can be applied to the memory cells with inferior characteristics. When the read action of FIG. 8A is performed, the voltage level of the driving voltage provided to the auxiliary select gate line $ASG_1$ is $V_{DV3}$ (1V) because the memory cells have inferior characteristics. Consequently, the memory cell generates a larger read current, and the sensing circuit 260 is able to judge the storage state of the memory cell more easily. In the situation of FIG. 7A, the memory cell has the better characteristics. Even if the driving voltage provided to the auxiliary select gate line $ASG_1$ is 0V (i.e., the auxiliary select gate line $ASG_1$ is not driven), the memory cell can generate the sufficient read current for allowing the sensing circuit 260 to judge the storage state of the memory cell.

Figure 9D:
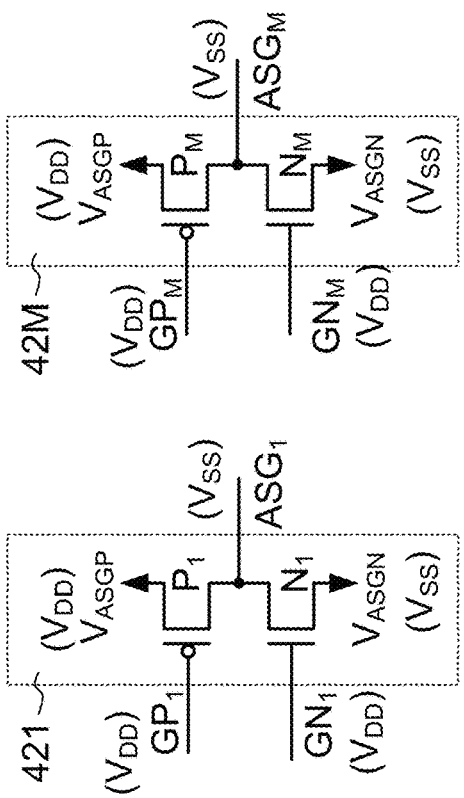
FIGS. 9C and 9D schematically illustrate bias voltages provided to the driving elements of the auxiliary select gate line driver when the erase action is performed.
Figure 9C:
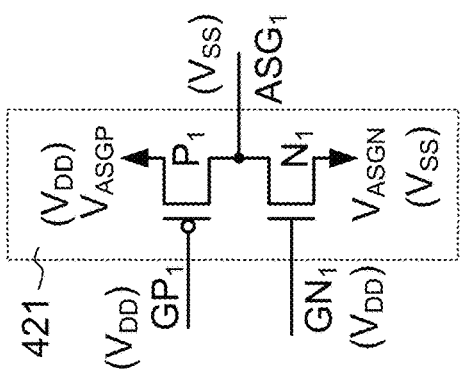
Figure 9B:
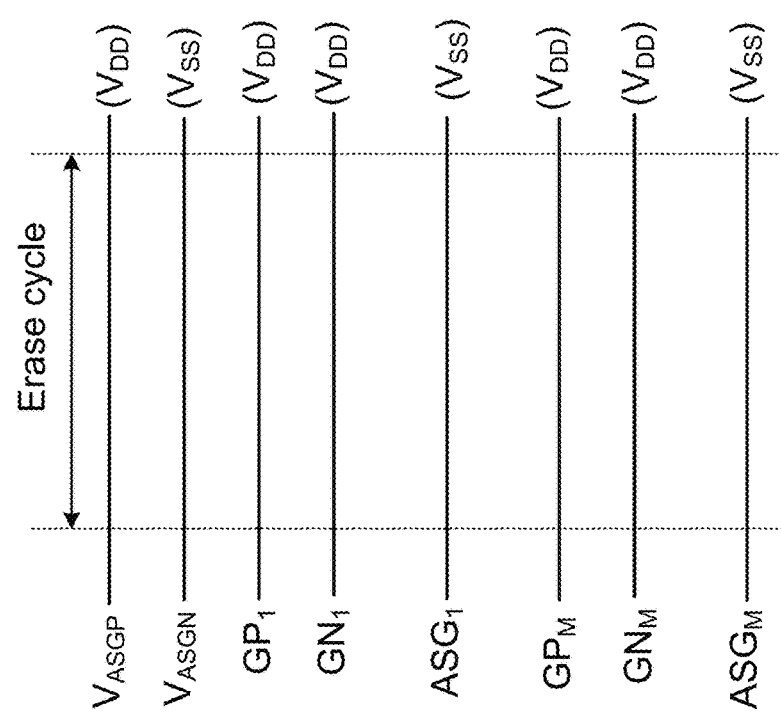
FIG. 9B is a schematic timing waveform diagram illustrating associated signals of the auxiliary select gate line driver.
Figure 9A:
FIG. 9A is a table about the bias voltages provided to the array structure when the non-volatile memory is in a first erase mode (ERS mode1)

FIG. 9A is a table about the bias voltages provided to the array structure when the non-volatile memory is in a first erase mode (ERS mode1). FIG. 9B is a schematic timing waveform diagram illustrating associated signals of the auxiliary select gate line driver. FIGS. 9C and 9D schematically illustrate bias voltages provided to the driving elements of the auxiliary select gate line driver when the erase action is performed.

During the erase cycle, the first supply voltage $V_{ASGP}$ is $V_{DD}$, and the second supply voltage $V_{ASGN}$ is $V_{SS}$. Each of the control signal $GP_1$, the control signal $GN_1$, the control signal $GP_M$ and the control signal $GN_M$ is $V_{DD}$. In the driving element 421, the P-type transistor $P_1$ is turned off, and the N-type transistor $N_1$ is turned on. The voltage level of the driving voltage provided from the driving element 421 to the auxiliary select gate line $ASG_1$ is $V_{SS}$ (0V). In the driving element 42M, the P-type transistor $P_M$ is turned off, and the N-type transistor $N_M$ is turned on. The voltage level of the driving voltage provided from the driving element 42M to the auxiliary select gate line $ASG_M$ is $V_{SS}$ (0V). That is, in the first erase mode (ERS mode1), all driving voltages provided to auxiliary select gate lines $ASG_1$~$ASG_M$ are $V_{SS}$ (0V). That means all the auxiliary select gate lines $ASG_1$~$ASG_M$ are not driven.

FIG. 10A is a table about the bias voltages provided to the array structure when the non-volatile memory is in a second erase mode (ERS mode2). FIG. 10B is a schematic timing waveform diagram illustrating associated signals of the auxiliary select gate line driver. FIGS. 10C and 10D schematically illustrate bias voltages provided to the driving elements of the auxiliary select gate line driver when the erase action is performed. A fourth driving voltage $V_{DV4}$ is a negative voltage. For example, the fourth driving voltage $V_{DV4}$ is −2.5V.

During the erase cycle, the first supply voltage $V_{ASGP}$ is $V_{DD}$/2, and the second supply voltage $V_{ASGN}$ is the fourth driving voltage $V_{DV4}$. The control signal $GP_1$ is $V_{DD}$/2. The control signal $GN_1$ is $V_{SS}$. The control signal $GP_M$ is $V_{DD}$/2. The control signal $GN_M$ is $V_{SS}$. In the driving element 421, the P-type transistor $P_1$ is turned off, and the N-type transistor $N_1$ is turned on. The voltage level of the driving voltage provided from the driving element 421 to the auxiliary select gate line $ASG_1$ is the fourth driving voltage $V_{DV4}$ (−2.5V). In the driving element 42M, the P-type transistor $P_M$ is turned off, and the N-type transistor $N_M$ is turned on. The voltage level of the driving voltage provided from the driving element 42M to the auxiliary select gate line $ASG_M$ is the fourth driving voltage $V_{DV4}$ (−2.5V). That is, in the second erase mode (ERS mode2), all driving voltages provided to auxiliary select gate lines $ASG_1$~$ASG_M$ are the fourth driving voltage $V_{DV4}$ (−2.5V).

In the second erase mode (ERS mode2), the first supply voltage $V_{ASGP}$ is not restricted to $V_{DD}$/2. For example, the first supply voltage $V_{ASGP}$ is a control voltage. The control voltage is lower than $V_{DD}$ and higher than or equal to 0V. Alternatively, in the erase cycle, the second supply voltage $V_{ASGN}$ is decreased to a negative voltage. For allowing the transistors $P_1$, $P_M$, $N_1$ and $N_M$ in the driving elements 421 and 42M to be operated in a safe operating area (SOA), the first supply voltage and the second supply voltage need to be properly adjusted. For example, at the beginning of the erase cycle, the first supply voltage $V_{ASGP}$ is firstly decreased to $V_{DD}$/2, and then the second supply voltage $V_{ASGN}$ is decreased to the fourth driving voltage $V_{DV4}$. At the end of the erase cycle, the second supply voltage $V_{ASGN}$ is firstly increased to $V_{SS}$, and then first supply voltage $V_{ASGP}$ is increased to $V_{DD}$.

In accordance with the present invention, the first erase mode (ERS mode1) can be applied to the memory cells with better characteristics, and the second erase mode (ERS mode2) can be applied to the memory cells with inferior characteristics. Please refer to FIG. 10A. In the second erase mode (ERS mode2), the fourth driving voltage $V_{DV4}$ with the negative voltage is provided to the auxiliary select gate lines $ASG_1$~$ASG_M$. Consequently, the voltage difference between the floating gate transistor in each of the memory cells $c_{11}$~$c_{MN}$ and the erase line EL (i.e., $V_{EE}$-$V_{DV4}$) is increased, and the electrons stored in the floating gate are more easily ejected to the erase line EL. After the erase action is completed, all of the memory cells $c_{11}$~$c_{MN}$ are in the erase state.

In the situation of FIG. 9A, the memory cells $c_{11}$~$c_{MN}$ have the better characteristics. Even if the driving voltage provided to each of the auxiliary select gate lines $ASG_1$~$ASG_M$ is 0V (i.e., the auxiliary select gate lines $ASG_1$~$ASG_M$ are not driven), the erase action can be performed. That is, in the erase cycle of the first erase mode (ERS mode1), the voltage $V_{SS}$ (0V) is provided to the auxiliary select gate lines $ASG_1$~$ASG_M$. Consequently, the electrons stored in the floating gate are ejected to the erase line EL. After the erase action is completed, all of the memory cells $c_{11}$~$c_{MN}$ are in the erase state.

In the two erase modes of the above embodiment, all of the memory cells $c_{11}$~$c_{MN}$ in the array structure 100 are changed to the erase state after the erase action is completed. Furthermore, the non-volatile memory may be operated in a third erase mode (ERS mode3). When the erase action is performed, the auxiliary select gate line driver 230 provides various driving voltages to the M auxiliary select gate lines $ASG_1$~$ASG_M$. Under the control of the auxiliary select gate line driver 230, a portion of the memory cells in the array structure 100 are erased, and another portion of the memory cells in the array structure 100 are not erased.

FIG. 11A is a table about the bias voltages provided to the array structure when the non-volatile memory is in a third erase mode (ERS mode3). FIG. 11B is a schematic timing waveform diagram illustrating associated signals of the auxiliary select gate line driver. FIGS. 11C and 11D schematically illustrate bias voltages provided to the driving elements of the auxiliary select gate line driver when the erase action is performed. A fifth driving voltage $V_{DV5}$ is a negative voltage, e.g., -2V. A sixth driving voltage $V_{DV6}$ is a positive voltage, e.g., 5V. In addition, the pull-up controller 412 and the pull-down controller 414 can provide more supply voltages to the driving elements 421~42M.

During the erase cycle, the driving element 421 receives a first supply voltage and a second supply voltage, and the driving element 42M receives a third supply voltage and a fourth supply voltage. The first supply voltage $V_{ASGP}$ is $V_{DD}/2$. The second supply voltage $V_{ASGN}$ is the fifth driving voltage $V_{DV5}$. The third supply voltage $V_{ASGP'}$ is the sixth driving voltage $V_{DV6}$. The fourth supply voltage $V_{ASGN'}$ is $V_{SS}$. The control signal $GP_1$ is $V_{DD}/2$. The control signal $GN_1$ is $V_{SS}$. The control signal $GP_M$ is $V_{SS}$. The control signal $GN_M$ is $V_{SS}$. In the driving element 421, the P-type transistor $P_1$ is turned off, and the N-type transistor $N_1$ is turned on. The voltage level of the driving voltage provided from the driving element 421 to the selected auxiliary select gate line $ASG_1$ is the fifth driving voltage $V_{DV5}$ (-2V). In the driving element 42M, the P-type transistor $P_M$ is turned on, and the N-type transistor $N_M$ is turned off. The voltage level of the driving voltage provided from the driving element 42M to the unselected auxiliary select gate line $ASG_M$ is the sixth driving voltage $V_{DV6}$ (5V). That is, in the third erase mode (ERS mode3), the driving voltages provided to auxiliary select gate lines $ASG_1$~$ASG_M$ are different.

For example, in the third erase mode (ERS mode3), the fifth driving voltage $V_{DV5}$ (-2V) is provided to the auxiliary select gate line $ASG_1$, and the sixth driving voltage $V_{DV6}$ (5V) is provided to the other the auxiliary select gate lines $ASG_2$~$ASG_M$. Consequently, the voltage difference between the floating gate transistor in each of the memory cells $c_{11}$~$c_{1N}$ (i.e., in the first row of the array structure 100) and the erase line EL (i.e., $V_{EE}$-$V_{DV5}$) is larger. Consequently, the electrons stored in the floating gate are ejected to the erase line EL. After the erase action is completed, the memory cells $c_{11}$~$c_{1N}$ in the first row of the array structure 100 are in the erase state.

In addition, the voltage difference between the floating gate transistor in each of the memory cells $c_{21}$~$c_{MN}$ (i.e., in the other rows of the array structure 100) and the erase line EL (i.e., $V_{EE}$-$V_{DV6}$) is smaller. Consequently, the electrons stored in the floating gate cannot be ejected to the erase line EL. After the erase action is completed, the storage states of the memory cells $c_{21}$~$c_{MN}$ in the other rows of the array structure 100 are kept unchanged (i.e., not changed to the erase state).

From the above descriptions, the present invention provides a non-volatile memory with an auxiliary select gate line driver. The array structure of the non-volatile memory comprises plural 2T2C memory cells in an array arrangement. The memory cells in the array structure are connected with the corresponding auxiliary select gate lines. The auxiliary select gate line driver can output specified driving voltages to the auxiliary select gate lines. Consequently, the programming efficiency, the erasing efficiency and the reading efficiency of non-volatile memory are enhanced.

In the above embodiments, the auxiliary select gate line driver of the non-volatile memory is selectively operated in one of seven modes according to the mode signal SM. The seven modes include the first program mode (PGM mode1), the second program mode (PGM mode2), the first read mode (READ mode1), the second read mode (READ mode2), the first erase mode (ERS mode1), the second erase mode (ERS mode2) and the third erase mode (ERS mode3). In some other embodiments, the auxiliary select gate line driver can be operated in one of less modes. For example, when the program action is performed, the auxiliary select gate line driver is selectively operated in the first program mode (PGM mode1) or the second program mode (PGM mode2). When the read action is performed, the auxiliary select gate line driver is operated in the second read mode only. When the erase action is performed, the auxiliary select gate line driver is operated in the second erase mode only.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A non-volatile memory, comprising:
an array structure connected with a first word line, a second word line, a source line, an erase line, a first auxiliary select gate line, a second auxiliary select gate line and a bit line, and comprising a first memory cell and a second memory cell, wherein the first memory cell is connected with the first word line, the first auxiliary select gate line, the erase line, the source line and the first bit line, and the second memory cell is connected with the second word line, the second auxiliary select gate line, the erase line, the source line and the first bit line;
a word line decoder generating a decoded signal;
a word line driver receiving the decoded signal and connected with the first word line and the second word, wherein the word line driver activates one of the first word line and the second word according to the decoded signal;
an auxiliary select gate line driver receiving a mode signal and the decoded signal, wherein the auxiliary select gate line driver is connected with the first auxiliary select gate line and the second auxiliary select gate line;
a bit line selector connected with the first bit line; and
a sensing circuit connected with the bit line selector,
wherein when a program action is performed, the first memory cell is determined as a selected memory cell, and the second memory cell is determined as an unselected memory cell,
wherein according to the mode signal, the first auxiliary select gate line and the second auxiliary select gate line are not driven by the auxiliary select gate line driver in a first phase of a first program mode; a first driving voltage is provided to the first auxiliary select gate line by the auxiliary select gate line driver in a second phase of the first program mode; the second auxiliary select gate line is not driven by the auxiliary select gate line driver in the second phase of the first program mode; and the first driving voltage is a positive voltage,
wherein according to the mode signal, a second driving voltage is provided to the first auxiliary select gate line and the second auxiliary select gate line by the auxiliary select gate line driver in a first phase of a second program mode; the first driving voltage is provided to the first auxiliary select gate line by the auxiliary select gate line driver in a second phase of the second program mode; the second auxiliary select gate line is not driven by the auxiliary select gate line driver in the second phase of the second program mode; and the second driving voltage is a negative voltage.

2. The non-volatile memory as claimed in claim 1, wherein the first memory cell comprises:
a first select transistor, wherein a source terminal of the first select transistor is connected with the source line, a gate terminal of the first select transistor is connected with the first word line;
a first floating gate transistor, wherein a source terminal of the first floating gate transistor is connected with a drain terminal of the first select transistor, and a drain terminal of the first floating gate transistor is connected with the first bit line;
a first capacitor, wherein a first terminal of the first capacitor is connected with a floating gate of the first floating gate transistor, and a second terminal of the first capacitor is connected with the erase line; and
a second capacitor, wherein a first terminal of the second capacitor is connected with the floating gate of the first floating gate transistor, and a second terminal of the second capacitor is connected with the first auxiliary select gate line.

3. The non-volatile memory as claimed in claim 2, wherein the second memory cell comprises:
a second select transistor, wherein a source terminal of the second select transistor is connected with the source line, a gate terminal of the second select transistor is connected with the second word line;
a second floating gate transistor, wherein a source terminal of the second floating gate transistor is connected with a drain terminal of the second select transistor, and a drain terminal of the second floating gate transistor is connected with the first bit line;
a third capacitor, wherein a first terminal of the third capacitor is connected with a floating gate of the second floating gate transistor, and a second terminal of the third capacitor is connected with the erase line; and
a fourth capacitor, wherein a first terminal of the fourth capacitor is connected with the floating gate of the second floating gate transistor, and a second terminal of the fourth capacitor is connected with the second auxiliary select gate line.

4. The non-volatile memory as claimed in claim 1, wherein according to the mode signal, the first auxiliary select gate line and the second auxiliary select gate line are not driven by the auxiliary select gate line driver in a first read mode, wherein according to the mode signal, a third driving voltage is provided to the first auxiliary select gate line and the second auxiliary select gate line by the auxiliary select gate line driver in a second read mode, wherein the third driving voltage is a positive voltage.

5. The non-volatile memory as claimed in claim 4, wherein according to the mode signal, the first auxiliary select gate line and the second auxiliary select gate line are not driven by the auxiliary select gate line driver in a first erase mode, wherein according to the mode signal, a fourth driving voltage is provided to the first auxiliary select gate line and the second auxiliary select gate line by the auxiliary select gate line driver in a second erase mode, wherein the third driving voltage is a negative voltage.

6. The non-volatile memory as claimed in claim 5, wherein according to the mode signal, a fifth driving voltage is provided to the first auxiliary select gate line by the auxiliary select gate line driver in a third erase mode, a sixth driving voltage is provided to the second auxiliary select gate line by the auxiliary select gate line driver in the third erase mode; wherein a storage state of the first memory cell is an erase state, and a storage state of the second memory cell is not changed; wherein the fifth driving voltage is a negative voltage, and the sixth driving voltage is a positive voltage.

7. The non-volatile memory as claimed in claim 6, wherein the auxiliary select gate line driver comprises:
a pull-up controller receiving the decoded signal and the mode signal, and generating a first control signal and a second control signal;
a pull-down controller receiving the decoded signal and the mode signal, and generating a third control signal and a fourth control signal;
a first driving element comprising a first P-type transistor and a first N-type transistor, wherein a source terminal of the first P-type transistor receives a first supply voltage, a gate terminal of the first P-type transistor receives the first control signal, and a drain terminal of the first P-type transistor is connected with the first auxiliary select gate line, wherein a drain terminal of the first N-type transistor is connected with the drain terminal of the first P-type transistor, a gate terminal of the first N-type transistor receive the third control signal, and a source terminal of the first N-type transistor receives a second supply voltage; and
a second driving element comprising a second P-type transistor and a second N-type transistor, wherein a source terminal of the second P-type transistor receives a third supply voltage, a gate terminal of the second P-type transistor receives the second control signal, and a drain terminal of the second P-type transistor is connected with the second auxiliary select gate line, wherein a drain terminal of the second N-type transistor is connected with the drain terminal of the second P-type transistor, a gate terminal of the second N-type transistor receive the fourth control signal, and a source terminal of the second N-type transistor receives a fourth supply voltage.

8. The non-volatile memory as claimed in claim 7, wherein in the third erase mode, the first supply voltage is a control voltage, the second supply voltage is a fifth driving voltage, the third supply voltage is a sixth driving voltage, the fourth supply voltage is a ground voltage, the first control signal is the control voltage, each of the second control signal, the third control signal and the fourth control signal is the ground voltage, the first auxiliary select gate line outputs the fifth driving voltage, and the second auxiliary select gate line outputs the sixth driving voltage.

9. The non-volatile memory as claimed in claim 5, wherein the auxiliary select gate line driver comprises:
a pull-up controller receiving the decoded signal and the mode signal, and generating a first control signal and a second control signal;
a pull-down controller receiving the decoded signal and the mode signal, and generating a third control signal and a fourth control signal;
a first driving element comprising a first P-type transistor and a first N-type transistor, wherein a source terminal of the first P-type transistor receives a first supply voltage, a gate terminal of the first P-type transistor receives the first control signal, and a drain terminal of the first P-type transistor is connected with the first auxiliary select gate line, wherein a drain terminal of the first N-type transistor is connected with the drain terminal of the first P-type transistor, a gate terminal of the first N-type transistor receive the third control signal, and a source terminal of the first N-type transistor receives a second supply voltage; and a second driving element comprising a second P-type transistor and a second N-type transistor, wherein a source terminal of the second P-type transistor receives the first supply voltage, a gate terminal of the second P-type transistor receives the second control signal, and a drain terminal of the second P-type transistor is connected with the second auxiliary select gate line, wherein a drain terminal of the second N-type transistor is connected with the drain terminal of the second P-type transistor, a gate terminal of the second N-type transistor receive the fourth control signal, and a source terminal of the second N-type transistor receives the second supply voltage.

10. The non-volatile memory as claimed in claim 9, wherein in the first phase of the first program mode, the first supply voltage is a first program voltage, the second supply voltage is a ground voltage, each of the first control signal, the second control signal, the third control signal and the fourth control signal is the first program voltage, the first auxiliary select gate line outputs the ground voltage, and the second auxiliary select gate line outputs the ground voltage.

11. The non-volatile memory as claimed in claim 10, wherein in the second phase of the first program mode, the first supply voltage is the first drive voltage, the second supply voltage is the ground voltage, the first control signal is the ground voltage, the second control signal is the first driving voltage, the third control signal is the ground voltage, the fourth control signal is the first driving voltage, the first auxiliary select gate line outputs the first driving voltage, and the second auxiliary select gate line outputs the ground voltage.

12. The non-volatile memory as claimed in claim 9, wherein in the first phase of the second program mode, the first supply voltage is a control voltage, the second supply voltage is the second driving voltage, the first control signal is the control voltage, the second control signal is the control voltage, the third control signal is a ground voltage, the fourth control signal is the ground voltage, the first auxiliary select gate line outputs the second driving voltage, and the second auxiliary select gate line outputs the second driving voltage.

13. The non-volatile memory as claimed in claim 12, wherein in the second phase of the second program mode, the first supply voltage is the first driving voltage, the second supply voltage is the ground voltage, the first control signal is the ground voltage, the second control signal is the first driving voltage, the third control signal is the ground voltage, the fourth control signal is the first driving voltage, the first auxiliary select gate line outputs the first driving voltage, and the second auxiliary select gate line outputs the ground voltage.

14. The non-volatile memory as claimed in claim 9, wherein in the first read mode, the first supply voltage is a system operation voltage, the second supply voltage is a ground voltage, each of the first control signal, the second control signal, the third control signal and the fourth control signal is the system operation voltage, the first auxiliary select gate line outputs the ground voltage, and the second auxiliary select gate line outputs the ground voltage.

15. The non-volatile memory as claimed in claim 9, wherein in the second read mode, the first supply voltage is the third driving voltage, the second supply voltage is a ground voltage, each of the first control signal, the second control signal, the third control signal and the fourth control signal is the ground voltage, the first auxiliary select gate line outputs the third driving voltage, and the second auxiliary select gate line outputs the third driving voltage.

16. The non-volatile memory as claimed in claim 9, wherein in the first erase mode, the first supply voltage is a system operation voltage, the second supply voltage is a ground voltage, each of the first control signal, the second control signal, the third control signal and the fourth control signal is the system operation voltage, the first auxiliary select gate line outputs the ground voltage, and the second auxiliary select gate line outputs the ground voltage.

17. The non-volatile memory as claimed in claim 9, wherein in the second erase mode, the first supply voltage is a control voltage, the second supply voltage is the fourth driving voltage, the first control signal is the control voltage, the second control signal is the control voltage, the third control signal is a ground voltage, the fourth control signal is the ground voltage, the first auxiliary select gate line outputs the fourth driving voltage, and the second auxiliary select gate line outputs the fourth driving voltage.

* * * * *